(12) United States Patent
Kasashima et al.

(10) Patent No.: US 7,263,430 B2
(45) Date of Patent: Aug. 28, 2007

(54) INTERNAL COMBUSTION ENGINE KNOCK DETERMINATION DEVICE AND IGNITION CONTROL SYSTEM INCLUDING THE SAME

(75) Inventors: Kenji Kasashima, Aichi-ken (JP); Rihito Kaneko, Aichi-ken (JP); Kenji Senda, Okazaki (JP); Shigeru Kamio, Nagoya (JP); Masaomi Inoue, Kariya (JP); Yuuichi Takemura, Anjo (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 114 days.

(21) Appl. No.: 11/108,809

(22) Filed: Apr. 19, 2005

(65) Prior Publication Data

US 2005/0251320 A1  Nov. 10, 2005

(30) Foreign Application Priority Data

Apr. 22, 2004 (JP) ............................. 2004-127025
Dec. 22, 2004 (JP) ............................. 2004-371489

(51) Int. Cl.
*G06F 17/00* (2006.01)
*F02P 5/152* (2006.01)
*G01L 23/22* (2006.01)

(52) U.S. Cl. ............. 701/111; 123/406.34; 123/406.47; 73/35.09

(58) Field of Classification Search ........... 123/406.29, 123/406.34–406.39, 406.47; 701/111, 104, 701/105; 73/35.06, 35, 115, 116, 35.09
See application file for complete search history.

(56) References Cited

U.S. PATENT DOCUMENTS 4,565,087 A  1/1986  Damson et al.
5,083,278 A *  1/1992  Matsuura .................... 701/111
5,088,044 A *  2/1992  Matsuura .................... 701/111
5,386,722 A  2/1995  Meyer et al.
5,421,195 A *  6/1995  Wlodarczyk ................. 73/115
6,520,149 B2  2/2003  Kokubo et al.
6,557,527 B2  5/2003  Miyaji
6,947,828 B2 *  9/2005  Fujiwara et al. ............ 701/111
6,968,825 B2 * 11/2005  Hitomi et al. ......... 123/406.34
2002/0014108 A1  2/2002  Hohner et al.
2003/0230281 A1 12/2003  Hoshino
2005/0000272 A1  1/2005  Takemura et al.
2005/0234632 A1 10/2005  Masuda et al.
2005/0234633 A1 10/2005  Takemura et al.
2005/0241369 A1* 11/2005  Inoue et al. ............... 73/35.09

FOREIGN PATENT DOCUMENTS

EP   0889309 A1   1/1999
EP   1 586 881 A2  10/2005

(Continued)

*Primary Examiner*—Willis R. Wolfe, Jr.
(74) *Attorney, Agent, or Firm*—Oliff & Berridge, PLC

(57) ABSTRACT

An engine ECU executes a program including the steps of: detecting a waveform of vibration of an engine at a predetermined knock detection gate; determining whether a detected vibration's waveform and a knock waveform model stored in memory match within a predetermined range; if the model and the detected vibration's waveform match within the predetermined range, determining that the engine knocks; and if the model and the detected vibration's waveform do not match within the predetermined range, then determining that the engine does not knock.

15 Claims, 12 Drawing Sheets

FOREIGN PATENT DOCUMENTS

| | | |
|---|---|---|
| EP | 1 586 882 A2 | 10/2005 |
| GB | 2 245 382 A | 1/1992 |
| JP | A 63-001761 | 1/1988 |
| JP | A 06-249047 | 9/1994 |
| JP | A 2000-205096 | 7/2000 |
| JP | A 2001-173508 | 6/2001 |
| JP | A 2001-227400 | 8/2001 |
| JP | A 2002-357156 | 12/2002 |
| JP | A 2003-172196 | 6/2003 |
| JP | A 2003-278592 | 10/2003 |
| JP | A 2005-23902 | 1/2005 |

* cited by examiner

INTERNAL COMBUSTION ENGINE KNOCK DETERMINATION DEVICE AND IGNITION CONTROL SYSTEM INCLUDING THE SAME

This nonprovisional application is based on Japanese Patent Applications Nos. 2004-127025 and 2004-371489 filed with the Japan Patent Office on Apr. 22, 2004 and Dec. 22, 2004, respectively, the entire contents of which are hereby incorporated by reference.

BACKGROUND OF THE INVENTION

1. Field of the Invention

The present invention relates generally to knock determination devices and ignition control systems including the same and particularly to such devices and systems that determine from a waveform of vibration of an internal combustion engine whether the engine knocks.

2. Description of the Background Art

Conventionally a technique employed to detect whether an internal combustion engine knocks is known. Japanese Patent Laying-Open No. 2000-205096 discloses an internal combustion engine knock detection device provided for an internal combustion engine and capable of detecting knocking with high precision. The knock detection device disclosed in this document includes a knock detector detecting the internal combustion engine's mechanical vibration to output a knock signal, and a knock determiner determining whether the engine knocks from the knock detector's knock signal in accordance with a reference knock level obtained by a background level BG (i.e., the knock detector's output level provided when the engine does not knock minus a mechanical vibration noise component and an electrical noise component that is multiplied by an adaptation constant K. The knock determiner determines that the engine knocks if a vibration component calculated by subtracting mechanical vibration and electrical components from a peak value of a signal output from the knock detector is larger than the reference knock level, and if the vibration component is equal to or smaller than the reference knock level the knock determiner determines that the engine does not knock.

The knock detection device described in this document can compare a vibration component corresponding to a peak value of a signal output from the knock determiner minus mechanical vibration and electrical noise components with a reference knock level obtained by removing mechanical vibration and electrical noise components to detect with high precision whether an internal combustion engine knocks or not.

The knock detection device described in the above document is, however, disadvantageous in that if the knock detector outputs a signal having a peak large in value the device detects that the engine knocks, and when the engine does not knock and the knock detector nonetheless outputs a signal having a peak increased in value a decision that the engine knocks may erroneously be made.

SUMMARY OF THE INVENTION

An object of the present invention is to provide a knock determination device capable of determining with high precision whether knocking occurs.

Another object of the present invention is to provide an ignition control system capable of determining with high precision whether knocking occurs, and if so, reducing the knocking.

Still another object of the present invention is to provide a knock determination device capable of reducing an erroroneous decision that knocking does not occur despite that knocking occurs.

Still another object of the present invention is to provide a knock determination device capable of objectively determining whether knocking occurs.

The present knock determination device for an internal combustion engine includes: a crank angle detector detecting the internal combustion engine's crank angle; a waveform detector detecting a waveform of vibration of the internal combustion engine for a predetermined crank angle range; a storage previously storing a waveform of vibration of the internal combustion engine for the predetermined crank angle range; a corrector correcting the waveform of the vibration of the internal combustion engine stored in the storage, as based on a waveform of vibration of the internal combustion engine detected when the internal combustion engine is in a predetermined driving condition; and a determiner determining whether the internal combustion engine knocks, as based on a result of comparing the detected waveform and the corrected waveform.

In accordance with the present invention a crank angle detector detects an internal combustion engine's crank angle and a waveform detector detects a waveform of vibration of the internal combustion engine for a predetermined crank angle range. A storage previously stores a waveform of vibration of the internal combustion engine for the predetermined crank angle range and a corrector corrects the waveform of the vibration of the internal combustion engine stored in the storage, as based on a waveform of vibration of the internal combustion engine detected when the internal combustion engine is in a predetermined driving condition. Thus as a waveform of vibration caused when the engine knocks a knock waveform model created for example in an experiment can be corrected as based a waveform of vibration detected when the engine does not knock, and the engine itself's mechanical vibration component can be contained in a waveform of vibration stored. As such, the knock waveform model can be more approximate to a waveform of vibration of the engine caused when the engine knocks. The model and a detected waveform can be compared to determine whether the engine knocks. Thus in addition to magnitude of vibration of the engine, a crank angle for which vibration occurs can also be depended on to determine whether the engine knocks. Thus the knock determination device can determine with high precision whether the engine knocks.

Preferably the determiner determines that the internal combustion engine knocks when the detected waveform and the corrected waveform match within a predetermined range.

In accordance with the present invention the determiner determines that the internal combustion engine knocks when the detected waveform and the corrected waveform match within a predetermined range. A knock waveform model corresponding to a waveform of vibration caused when the engine knocks can previously be created for example in an experiment and stored and if for example a corrected version of this knock waveform model and a detected waveform provide a deviation within a reference value for each crank angle or such deviations' average falls within the reference value a decision can be made that the engine knocks. Thus in addition to magnitude of vibration of the engine, a crank angle for which vibration occurs can also be depended on to determine whether the engine knocks. As a result whether the engine knocks can be determined with high precision.

Still preferably, the corrector corrects the waveform of the vibration of the internal combustion engine stored in the storage, as based on a waveform of vibration of the internal combustion engine detected when fuel supplied to the internal combustion engine is interrupted.

In accordance with the present invention, the corrector corrects the waveform of the vibration of the internal combustion engine stored in the storage, as based on a waveform of vibration of the internal combustion engine detected when fuel supplied to the internal combustion engine is interrupted. When the engine is interrupted from receiving the fuel, the engine does not knock, and a waveform of vibration detected will be that of mechanical vibration of the engine itself. This waveform of mechanical vibration of the engine itself can be used to correct a stored waveform of vibration to allow the stored waveform of vibration to contain the engine itself's mechanical vibration component. The stored waveform of vibration can thus be more approximate to a waveform of vibration of the engine caused when the engine knocks. As a result, whether the engine knocks can be determined with high precision.

Still preferably the corrector corrects the waveform of the vibration of the internal combustion engine stored in the storage, as based on a waveform of vibration of the internal combustion engine detected when the internal combustion engine's output transitions.

When the internal combustion engine's output transitions, the determiner determines whether the internal combustion engine knocks, as based on a result of comparing the detected waveform and the corrected waveform.

In accordance with the present invention the corrector corrects the waveform of the vibration of the internal combustion engine stored in the storage, as based on a waveform of vibration of the internal combustion engine detected when the internal combustion engine's output transitions. This allows the stored waveform of vibration to contain a vibration component provided in the transition. As such, the stored waveform of vibration can be more approximate to a waveform of vibration of the engine caused in the transition when the engine knocks. In the transition, a detected waveform and a corrected waveform are compared and from a result thereof the determiner determines whether the engine knocks. Whether the engine knocks can thus be determined with precision.

The present invention in another aspect provides a knock determination device for an internal combustion engine, including: a crank angle detector detecting the internal combustion engine's crank angle; a waveform detector detecting a waveform of vibration of the internal combustion engine for a predetermined crank angle range; a storage previously storing a waveform of vibration of the internal combustion engine for the predetermined crank angle range; and a determiner determining whether the internal combustion engine knocks, as based on a result of comparing the detected waveform and the stored waveform. When the internal combustion engine has a spark retard as compared with a predetermined crank angle, the determiner determines whether the internal combustion engine knocks, as based on a result of comparing a waveform of vibration of a frequency higher than a predetermined frequency with the stored waveform.

In accordance with the present invention, a crank angle detector detects an internal combustion engine's crank angle and a waveform detector detects a waveform of vibration of the internal combustion engine for a predetermined crank angle range. A storage previously stores a waveform of vibration of the internal combustion engine for the predetermined crank angle range and a determiner determines whether the internal combustion engine knocks, as based on a result of comparing the detected waveform and the stored waveform. A knock waveform model corresponding to a waveform of vibration caused when the engine knocks can previously be created for example in an experiment and stored and the model and a detected waveform can be compared to determine whether the engine knocks. As such, in addition to magnitude of vibration of the engine, a crank angle for which vibration occurs can also be depended on to determine whether the engine knocks. When the internal combustion engine has a spark retard as compared with a predetermined crank angle (formed for example when the engine starts), a decision is made as to whether the internal combustion engine knocks, as based on a result of comprising a waveform of vibration of a frequency higher than a predetermined frequency with the stored waveform. If the internal combustion engine has a spark retard as compared with the predetermined crank angle, and the engine does not knock, a waveform of vibration of low frequency can nonetheless be analogous to a waveform provided when the engine knocks. In such a case, of detected waveforms, a waveform of vibration of a frequency higher than the predetermined frequency can be compared with the stored waveform and from a result thereof whether the internal combustion engine knocks can be determined. This can minimize an erroneous decision that the engine knocks and that allow whether the engine knocks to be determined with high precision. Thus the knock determination device can be determine with high precision whether the engine knocks.

The present invention in still another aspect provides an ignition covered system including: the knock determination device, an a spark retard device providing the internal combustion engine with a spark retard when the look determination device determines that the internal combustion engine knocks.

In accordance with the present invention when the knock determination device determines that the internal combustion engine knocks the spark retard device provides the internal combustion engine with a spark retard. Thus the system can determine with high precision whether the engine knocks, and if so reduce the knocking.

The present invention in still another aspect provides a knock determination device for an internal combustion engine, including: a crank angle detector detecting the internal combustion engine's crank angle; a vibration detector detecting a value associated in magnitude with vibration of the internal combustion engine; a waveform detector detecting, as based on the value associated in magnitude with vibration of the internal combustion engine, a waveform of vibration of the internal combustion engine for a predetermined crank angle range; a storage previously storing a waveform of vibration of the internal combustion engine; and a determiner determining whether the internal combustion engine knocks, as based on a result of comparing the detected waveform with the stored waveform. The waveform detector detects the waveform of vibration of the internal combustion engine, as based on the value associated in magnitude with vibration of the internal combustion engine divided by a maximum one of values associated in magnitude with vibration detected.

In accordance with the present invention the crank angle detector detects the internal combustion engine's crank angle. The vibration detector detects a value associated in magnitude with vibration of the internal combustion engine.

The waveform detector detects, as based on the value associated in magnitude with vibration of the internal combustion engine, a waveform of vibration of the internal combustion engine for a predetermined crank angle range. The storage previously stores a waveform of vibration of the internal combustion engine. The determiner determines whether the internal combustion engine knocks, as based on a result of comparing the detected waveform with the stored waveform. A knock waveform model corresponding to a waveform of vibration caused when the engine knocks can previously be created for example in an experiment and stored and the model and a detected waveform can be compared to determine whether the engine knocks. Thus whether the engine's vibration is attributed to knocking can be analyzed more specifically. In doing so, a value associated in magnitude with vibration is divided by the maximum one of values associated in magnitude with vibration detected to represent detected waveform's vibration in magnitude by a dimensionless number of 0 to 1. Thus, regardless of magnitude of vibration attributed to knocking, a detected waveform and a knock waveform model can be compared to determine whether the engine knocks. As a result the knock determination device can determine with high precision whether the engine knocks.

Preferably, the vibration detector detects at a predetermined interval the value associated in magnitude with vibration of the internal combustion engine.

In accordance with the present invention, a value associated in magnitude with vibration of the internal combustion engine can be detected at a predetermined interval. This allows minimized detection of a waveform having a complicated form associated with vibration having a magnitude varying minutely as a crank angle changes, and a waveform having a form suitable for comparison with a knock waveform model can be detected. This allows a waveform to be compared with the knock waveform model with high precision.

Still preferably, the determiner determines whether the internal combustion engine knocks, as based on a result of comparing the detected waveform with the stored waveform while a timing of the detected waveform attaining vibration maximized in magnitude and that of the stored waveform attaining vibration maximized in magnitude are matched.

In accordance with the present invention, a detected waveform and a stored waveform can be compared at a crank angle considered as an angle for which the engine knocks. This allows detected and stored waveforms to be compared at a crank angle free of knocking to minimize an erroneous decision that the engine knocks.

Still preferably the knock determination device further includes a deviation calculator calculating a deviation of the detected waveform and the stored waveform. The determiner determines from the deviation whether the internal combustion engine knocks.

In accordance with the present invention a difference between detected and stored waveforms is represented numerically as a deviation. Thus the detected waveform can be numerically analyzed to objectively determine whether the engine knocks.

Still preferably, the determiner determines whether the internal combustion engine knocks from the deviation and in addition thereto the maximum value associated in magnitude with vibration of the internal combustion engine.

In accordance with the present invention, in addition to vibration's waveform, vibration's magnitude can also be depended on to determine whether the engine knocks with higher precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter with reference to the drawings the present invention in embodiments will be described. In the following description, identical components are identically denoted and also identical in name and function.

First Embodiment

Figure 1:
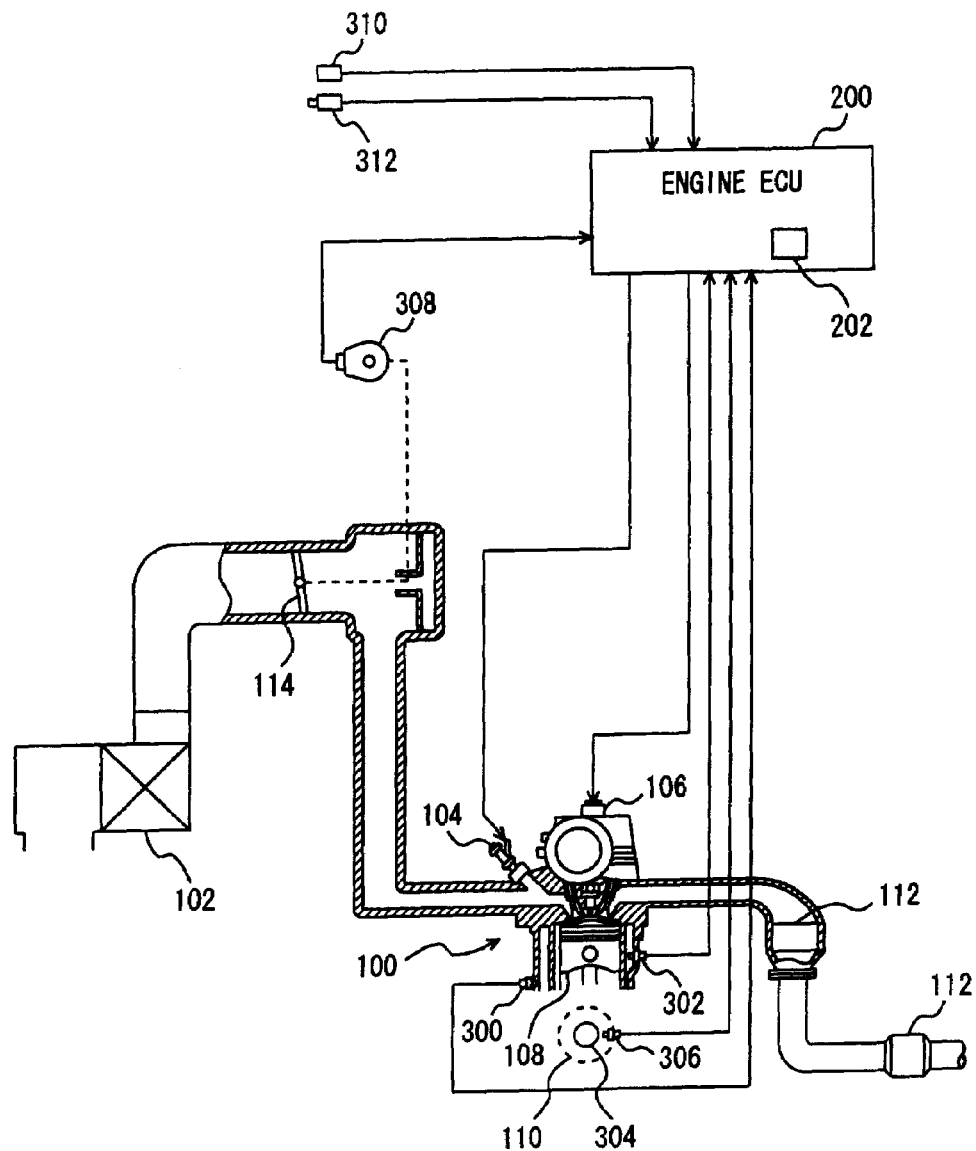
FIG. 1 is a control block diagram for control, showing an engine controlled by the present ignition control system in a first embodiment.

With reference to FIG. 1 an engine 100 controlled by the present ignition control system in a first embodiment will be described. Engine 100 is an internal combustion engine that allows a mixture of air aspirated through an air cleaner 102 and a fuel injected by an injector 104 to be ignited in a combustion chamber by an ignition plug 104 and thus combusted.

The air fuel mixture combusted causes combustion pressure which presses a piston 108 down and a crank shaft 110 rotates. The combusted air fuel mixture (or exhaust gas) is purified by a ternary catalyst 112 and thereafter discharged outside the vehicle. Engine 110 aspirates an amount of air adjusted by a throttle valve 114.

Engine 100 is controlled by an engine ECU 200 having connected thereto a knock sensor 300, a water temperature sensor 302, a crank position sensor 306 arranged opposite a timing rotor 304, a throttle opening sensor 308, a vehicle speed sensor 310, and an ignition switch 312.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of refrigerant water in engine 100 at a water jacket and transmits a signal representing a resultant detection to engine ECU 200.

Timing rotor 304 is provided at a crank shaft 110 and rotates as crank shaft 110 do. Timing rotor 304 is circumferentially provided with a plurality of protrusions spaced as predetermined. Crank position sensor 306 is arranged opposite the protrusions of timing rotor 304. When timing rotor 304 rotates, an air gap between the protrusions of timing rotor 304 and crank position sensor 306 varies, and a coil portion of crank position sensor 306 passes an increased/decreased magnetic flux and thus experiences electromotive force. Crank position sensor 306 transmits a signal representing the electromotive force to engine ECU 200. From the signal, engine ECU 200 detects a crank angle.

Throttle opening sensor 308 detects a throttle opening and transmits a signal representing a resultant detection to engine ECU 200. Vehicle speed sensor 310 detects a rate of rotation of a wheel (not shown) and transmits a signal representing a resultant detection to engine ECU 200. From the wheel's rate of rotation engine ECU 200 calculates the vehicle's speed. Ignition switch 312 is turned on by a driver starting engine 100.

Engine ECU 200 uses the signals transmitted from each sensor and ignition switch 312 and a map and program stored in a memory 202 to perform an arithmetic operation to control equipment so that engine 100 has a desired driving condition.

In the present embodiment engine ECU 200 depends on a signal transmitted from knock sensor 300 and a crank angle to detect a waveform of vibration of engine 100 at a predetermined knock detection gate (a section from a predetermined first crank angle to a predetermined second crank angle) (hereinafter the waveform will also simply be referred to as "vibration waveform") and from the detected vibration waveform determines whether engine 100 knocks.

Figure 2:
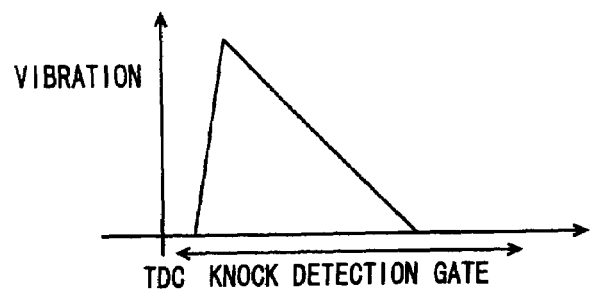
FIG. 2 is a diagram representing a knock waveform model stored in a memory of an engine BCU in the present ignition control system in the first embodiment.

To determine whether the engine knocks, the engine ECU 200 memory 202 stores a knock waveform model corresponding to a model of a waveform of vibration caused when engine 100 knocks, as shown in FIG. 2. The model is stored in association with vibration of a plurality of frequency bands. More specifically, a plurality of such models are stored. The models are obtained as follows: an experiment or the like is conducted to cause engine 100 to knock to detect the engine's vibration waveform, from which the models are previously created and stored. It should be noted, however, that the models may be created by a different method. Engine ECU 200 compares a detected waveform with the stored models to determine whether engine 100 knocks.

Figure 3:
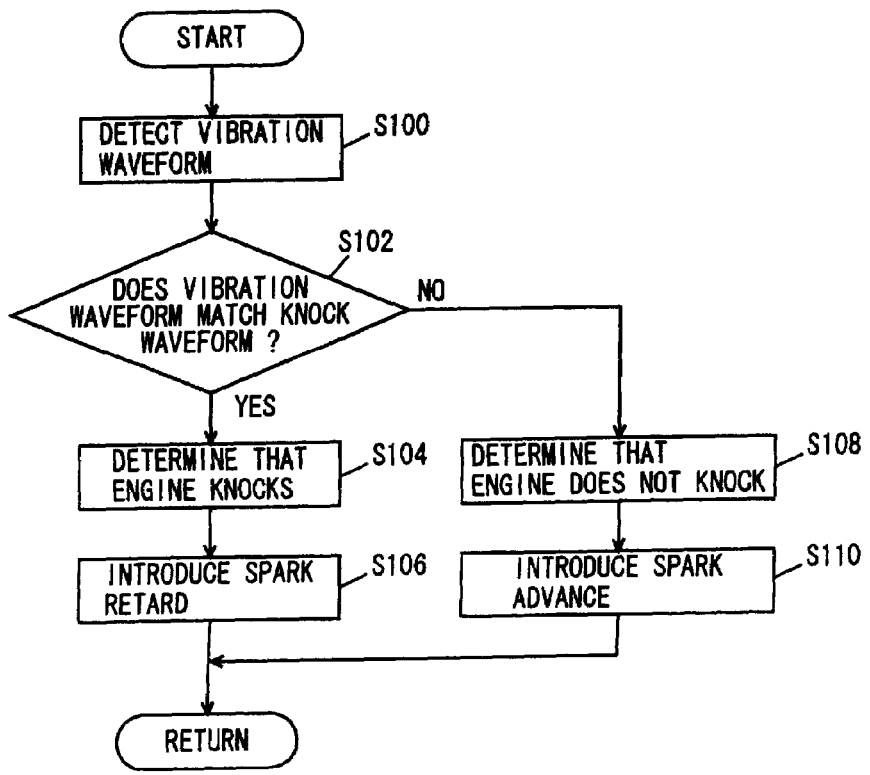
FIG. 3 is a flow chart for illustrating a structure for control of a program executed by the engine ECU in the present ignition control system in the first embodiment.

With reference to FIG. 3, in present embodiment's ignition control system engine ECU 200 executes a program controlled in a structure as will be described hereinafter.

At step (hereinafter simply referred to as "S") 100 engine ECU 200 detects the engine 100 vibration waveform based on a signal transmitted from knock sensor 300 and a crank angle.

At S102 engine ECU 200 determines for all frequency bands whether any detected vibration waveform matches any stored knock waveform model within a predetermined range. In the present embodiment whether the detected vibration waveform and the model match within the predetermined range may be determined for example by whether for each crank angle the engine 100 vibrates with a deviation falling within a reference value or whether such deviations averaged fall within the reference value. Note that a method different than the above may alternatively be employed to determine whether the detected waveform and the stored model match within the predetermined range. If the detected waveform and the stored model match within the predetermined range (YES at S102) the control proceeds with S104. Otherwise (NO at S102) the control proceeds with S108.

At S104 engine ECU 200 determines that engine 100 knocks. At S106 engine ECU 200 introduces a spark retard. At S108 engine ECU 200 determines that engine 100 does not knock. At S110 engine ECU 200 introduces a spark advance.

In accordance with the above described configuration and flow chart for the present embodiment's ignition control system engine ECU 200 operates as will be described hereinafter.

When a driver turns on ignition switch 312 to start engine 100 and knock sensor 300 transmits a signal from which and a crank angle the engine 100 vibration waveform is detected (S100) and a decision is made as to whether the detected waveform matches a stored knock waveform model within the predetermined range (S102).

Figure 4:
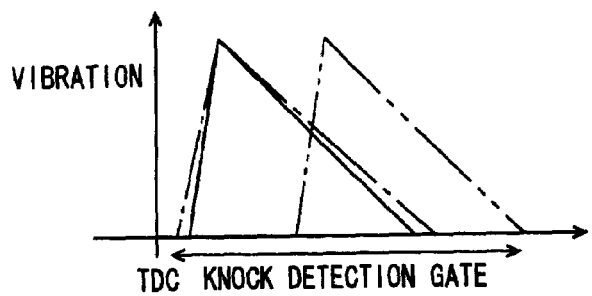
FIG. 4 represents a knock waveform model and an engine's vibration waveform.

As shown in FIG. 4, if a vibration waveform indicated by a chained, single dashed line and a knock waveform model indicated by a solid line match within the predetermined range (YES at S102) the control determines that the engine knocks (S104) and introduces a spark retard (S106) to prevent the engine from knocking.

As shown in FIG. 4, if a vibration waveform indicated by a chained, double dashed line and the model indicated by the solid line do not match within the predetermined range (NO at S102), then the control determines that the engine does not knock even if the vibration waveform has a peak equal to or larger in value than that of vibration of the model (S108). The control introduces a spark advance (S110).

Thus in the present embodiment's ignition control system the engine ECU depends on a signal received from a knock sensor and a crank angle to detect the engine's vibration waveform at a predetermined knock detection gate and compares the vibration waveform with a knock waveform model to determine whether the engine knocks. Thus in addition to vibration's magnitude a crank angle for which vibration occurs can also be depended on to determine whether the engine knocks. Consequently, whether engine knocks or not can be determined with high precision.

Second Embodiment

With reference to FIGS. 5-8 the present invention in a second embodiment will be described. The present embodiment is distinguished from the first embodiment by correcting a knock waveform model. The remainder in configuration and function is identical to the first embodiment.

Figure 5:
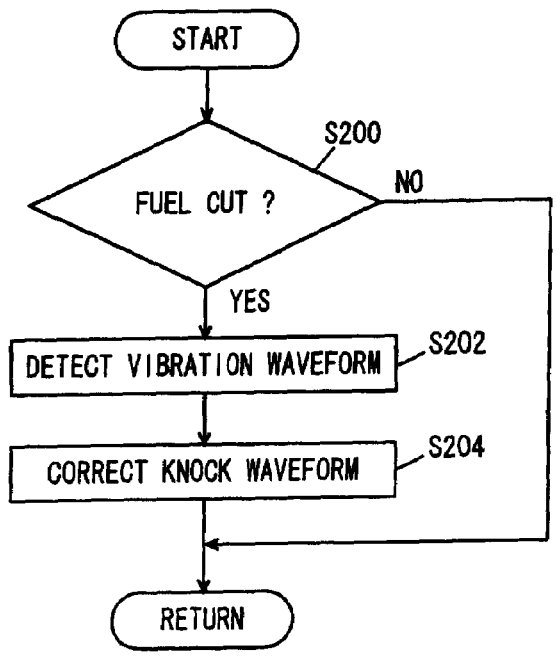
FIG. 5 is a flow chart for illustrating a structure for control of a program executed by the engine ECU in the present ignition control system in a second embodiment.

With reference to FIG. 5, the present embodiment's ignition control system has engine ECU 200 executing a program controlled in a structure as will be described hereinafter. Note that engine ECU 200 executes the program described in the first embodiment and in addition thereto a program as will be described hereinafter.

At S200 engine ECU 200 determines whether injector 100 is interrupted from injecting a fuel (hereinafter also referred to as "the fuel is cut"). Whether the fuel is cut may be determined by whether the vehicle is in a driving condition cutting the fuel (e.g., whether the accelerator is turned off and the engine rotates at at least a predetermined rate). If the fuel is cut (YES at S200) the control proceeds with S202, otherwise (NO at S202) this process ends.

At S202 engine ECU 200 detects the engine 100 vibration waveform from a signal transmitted from knock sensor 300 and a crank angle. At S204 engine ECU 200 depends on the detected vibration waveform to correct a knock waveform model stored in memory 202.

In accordance with the above described configuration and flow chart for the present embodiment's ignition control system engine ECU 200 operates as will be described hereinafter.

Figure 6:
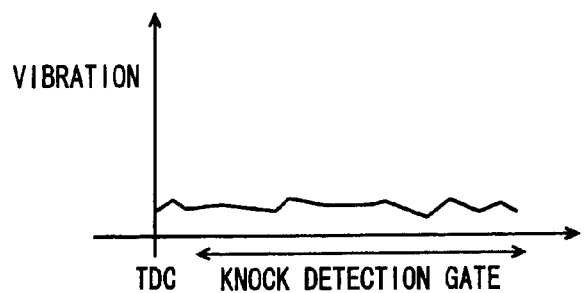
FIG. 6 represents an engine's vibration waveform detected when spraying a fuel is stopped.

When the fuel is cut (YES at S200) the engine 100 vibration waveform is detected (S202). When the fuel is cut, there is no vibration occurring attributed to combustion (including knocking), and the detected waveform will be a waveform of mechanical vibration of engine 100 itself, as shown in FIG. 6. The engine 100 itself's mechanical vibration occurs, regardless of whether the engine knocks, as long as crank shaft 100 rotates. Accordingly, vibration detected by knock sensor 300 constantly contains mechanical vibration of engine 100 itself.

Figure 7:
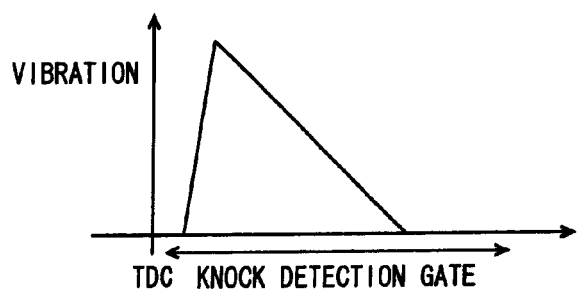
FIG. 7 represents an uncorrected knock waveform model stored in the memory of the engine ECU in the present ignition control system in the second embodiment.
Figure 8:
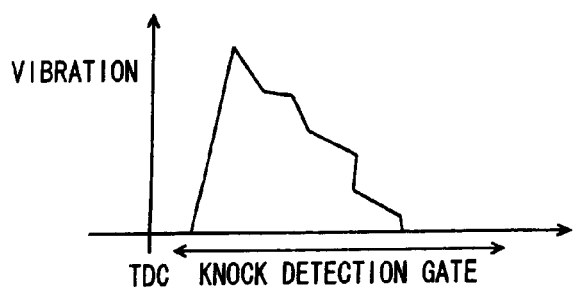
FIG. 8 represents a knock waveform model corrected in the present ignition control system in the second embodiment.

At such, if the FIG. 7 model is fixed, and the engine knocks, the engine 100 itself's mechanical vibration affects so that a detected vibration waveform may not match the model. To eliminate the effect by the mechanical vibration of engine 100 itself, the model has the waveform of the mechanical vibration of engine 100 itself added thereto to correct the model, as shown in FIG. 8 (S204). Thus the model can be more approximate to a waveform of vibration of engine 100 caused when the engine knocks.

Thus in the present embodiment's ignition control system the engine ECU corrects a knock waveform model in a memory by mechanical vibration of the engine itself detected when the fuel is cut. Thus the model can be approximated to the engine's vibration waveform caused when the engine knocks, and whether the engine knocks or not can thus be determined with high precision.

Third Embodiment

With reference to FIGS. 9-12 the present invention in a third embodiment will be described. The present embodiment is distinguished from the first embodiment by correcting a knock waveform model. The remainder in configuration and function is identical to the first embodiment.

Figure 9:
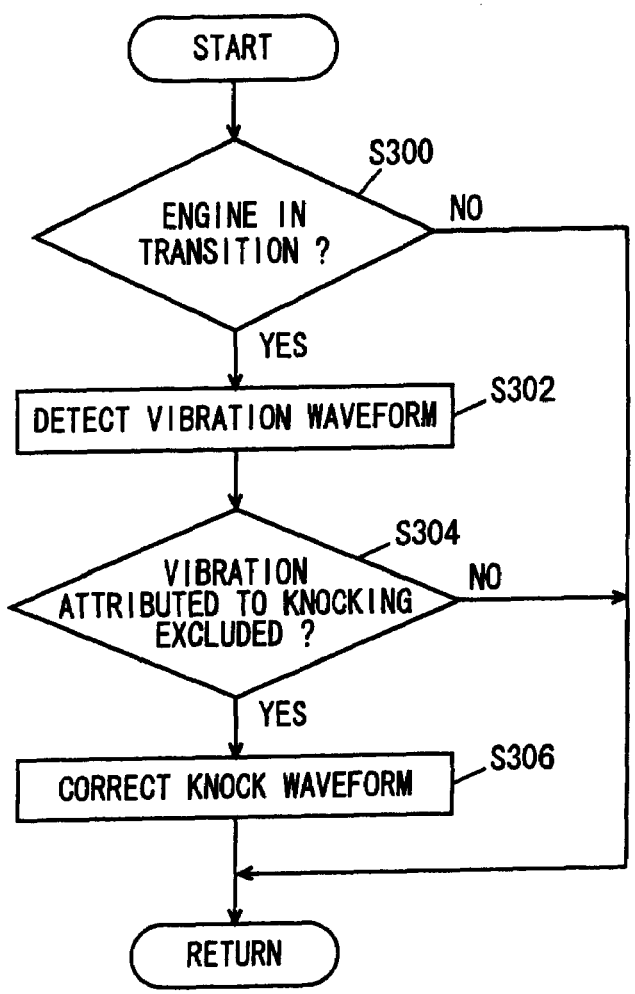
FIG. 9 is a flow chart for illustrating a structure for control of a program executed by the engine ECU in the present ignition control system in a third embodiment.
Figure 10:
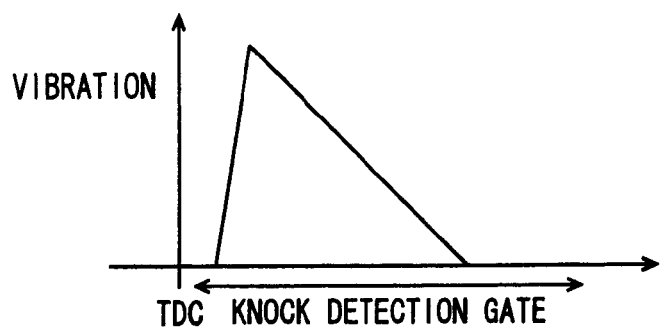
FIG. 10 represents an uncorrected knock waveform model stored in the memory of the engine ECU in the present ignition control system in the third embodiment.

With reference to FIG. 9, the present embodiment's ignition control system has engine ECU 200 executing a program controlled in a structure as will be described hereinafter. Note that engine ECU 200 executes the program described in the first embodiment and in addition thereto a program as will be described hereinafter.

At S300 engine ECU 200 determines whether the engine 100 provides an output that transitions (or varies). Whether the engine 100 output is in transition may be determined for example by whether a throttle opening's variation rate, aspirated air's temperature, the engine 100 refrigerant water's temperature and the like are larger in value than predetermined. If the engine 100 output is in transition (YES at S300), the control proceeds with S302. Otherewise (NO at S300) this process ends.

At S302 engine ECU 200 detects the engine 100 vibration waveform from a signal received from knock sensor 300. At S304 engine ECU 200 determines whether the detected vibration waveform does not contain a vibration component attributed to knocking. This decision may be made for example by whether the vibration waveform has a peak having a value smaller than a predetermined value. If the detected vibration waveform does not contain a vibration component attributed to knocking (YES at S304), the control proceeds with S306. Otherwise (NO at S304) this process ends. At S306 engine ECU 200 corrects a knock waveform model in memory 202, as based on the detected vibration waveform.

In accordance with the above described configuration and flow chart for the present embodiment's ignition control system engine ECU 200 operates as will be described hereinafter.

If the engine 100 output is in transition (YES at S300) the engine 100 vibration waveform is detected (S302). If the engine 100 output is in transition, the engine tends to knock, and it is necessary to determine with high precision whether the engine has knocked. When the engine's output is in transition, however, the engine 100 vibration varies even if the engine does not knock. As such, if the FIG. 10 knock waveform model is fixed, and engine 100 knocks, the engine 100 itself's mechanical vibration affects so that the model and a detected vibration waveform do not match, which may result in an erroneous decision that the engine does not knock.

Figure 11:
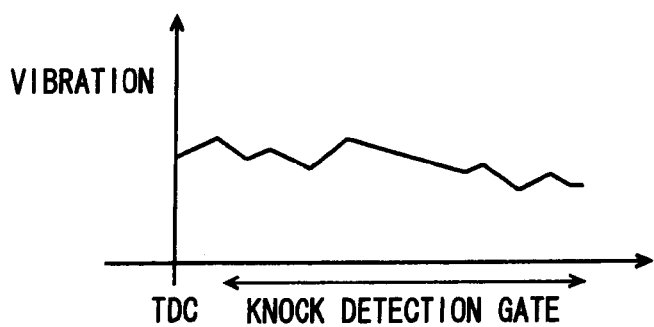
FIG. 11 represents an engine's vibration waveform detected when the engine's output is in transition.
Figure 12:
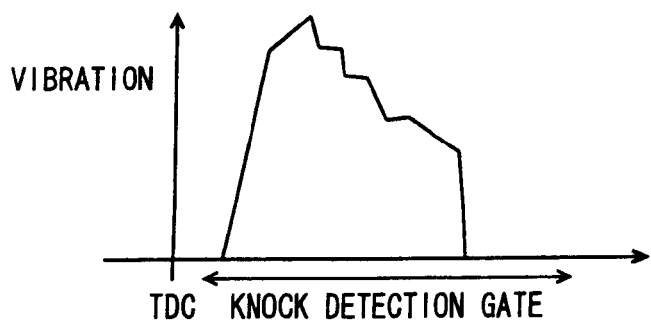
FIG. 12 represents a knock waveform model corrected in the present ignition control system in the third embodiment.

To prevent such erroneous decision, as shown in FIG. 11, if a detected vibration waveform does not contain a vibration component attributed to knocking (YES at S304), the vibration waveform is added to a knock waveform model stored in memory 202 to correct the model, as shown in FIG. 12 (S306). This allows the model stored in memory 202 to match by the engine 100 vibration waveform caused when the engine knocks.

Thus in the present embodiment's ignition control system the engine ECU corrects a knock waveform model stored in a memory by a vibration waveform detected when the engine's output is in transition. Thus the model can be more approximate to a vibration waveform caused when the engine knocks, and whether the engine knocks or not can be determined with high precision.

Fourth Embodiment

Figure 13:
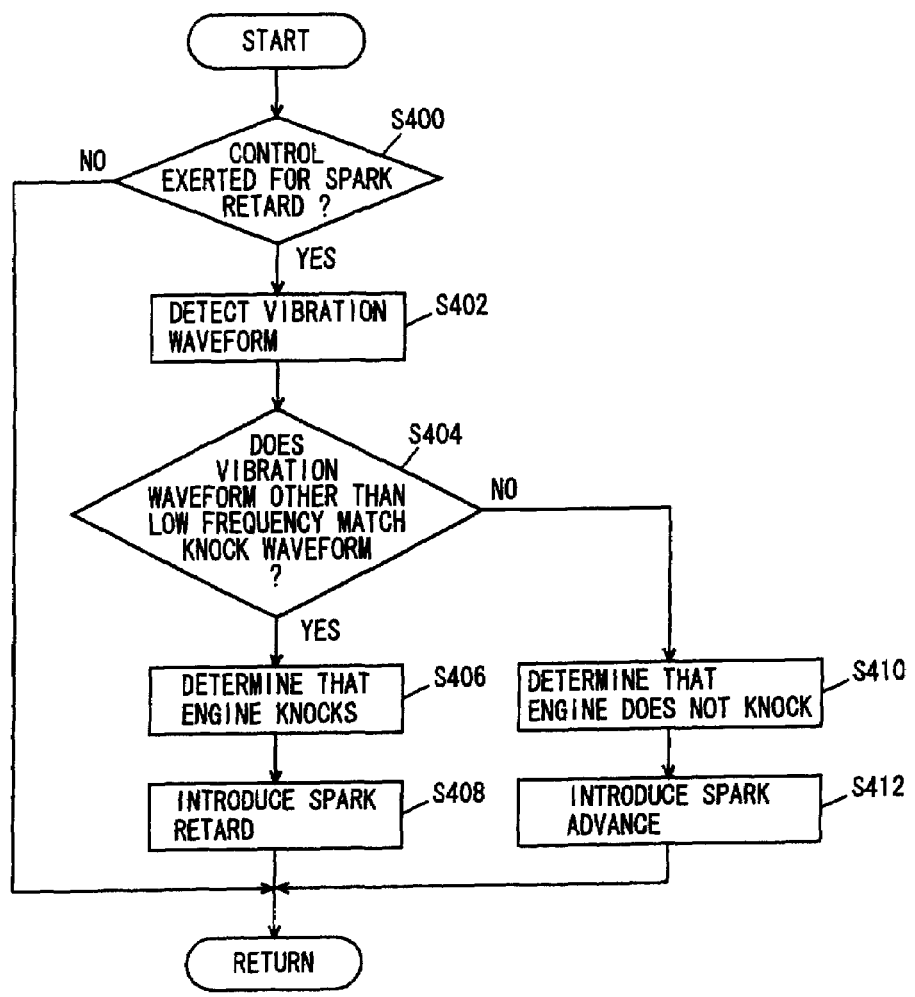
FIG. 13 is a flow chart for illustrating a structure for control of a program executed by the engine ECU in the present ignition control system in a fourth embodiment.

With reference to FIG. 13 the present embodiment in a fourth embodiment will be described. While in the first embodiment a decision as to whether an engine knocks is made from waveforms of vibrations of all frequency bands, in the present embodiment such decision is made from a waveform of vibration of a frequency equal to or larger than a predetermined frequency. The remainder in configuration and hence function is identical to the first embodiment.

With reference to FIG. 13, in present embodiment's ignition control system engine ECU 200 executes a program controlled in a structure as will be described hereinafter.

At S400 engine ECU 200 determines whether engine 100 is controlled to have a spark retard from a predetermined crank angle (formed for example when engine 100 starts) (hereinafter such control will also be referred to as "spark retard control"). Whether spark retard control is effected may be determined from whether the vehicle is in a condition subject to spark retard, such as whether the catalyst' temperature is lower than a predetermined temperature, whether the vehicle is rapidly accelerated, or the like. If spark retard control is effected (YES at S400), the control proceeds with S402, otherwise (NO at S400) this process ends.

At S402 engine ECU 200 detects the engine 100 vibration waveform based on a signal transmitted from knock sensor 300. At S404 engine ECU 200 determines whether a detected vibration waveform that is equal to or higher than a predetermined frequency matches a knock waveform model stored in memory 202 within a predetermined range. More specifically, whether the engine knocks is not determined for waveforms of vibration of low frequency. If the model and the detected vibration waveform match within the predetermined range (YES at S404) the control proceeds with S406, otherwise (NO at S404) the control proceeds with S410.

At S406 engine ECU 200 determines that engine 100 knocks. At S408 engine ECU 200 introduces a spark retard. At S410 engine ECU 200 determines that engine 100 does not knock. At S412 engine ECU 200 introduces a spark advance.

In accordance with the above described configuration and flow chart for the present embodiment's ignition control system engine ECU 200 operates as will be described hereinafter.

When spark retard control is effected (YES at S400), the engine 100 vibration waveform is detected (S402). During spark retard control, there exists a crank angle range for which a waveform of vibration of low frequency is analogous to a waveform provided when the engine knocks despite that the engine does not knock (hereinafter this range will be referred to as a pseudo knock range). As such, if whether the engine knocks is determined from the waveform of vibration of low frequency, a decision that the engine knocks may erroneously be made despite that the engine does not knock.

To prevent such erroneous decision associated with the pseudo knock range, a decision is made as to whether a detected vibration waveform that is equal to or higher than a predetermined frequency matches a knock waveform model stored in memory 202 within a predetermined range (S404).

If the model and the detected vibration waveform match within the predetermined range (YES at S404) a decision is made that engine 100 knocks (S406) and a spark retard is introduced (S408) to prevent the engine from knocking.

When the model and the detected vibration waveform do not match within the predetermined range (NO at S404), a decision is made that engine 100 does not knock (S410), and a spark advance is introduced (S412).

Thus in the present embodiment's ignition control system when spark retard control is effected the engine ECU determines whether a detected vibration waveform that is equal to or higher than a predetermined frequency matches a knock waveform model stored in a memory within a predetermined range. If so, a decision is made that the engine knocks. Otherwise, a decision is made that the engine does not knock. This can prevent an erroneous decision associated with a pseudo knock range for which a waveform of vibration of low frequency is analogous to a waveform provided when the engine knocks.

Fifth Embodiment

With reference to FIGS. 14-18 the present invention in a fifth embodiment will be described. The present invention differs from the first embodiment in that waveforms of vibration of different frequency bands are composited together to detect a vibration waveform. Furthermore a rock waveform model provides vibration having a magnitude that does not uniquely correspond to a crank angle. The remainder in configuration and hence function is identical to the first embodiment.

Figure 14:
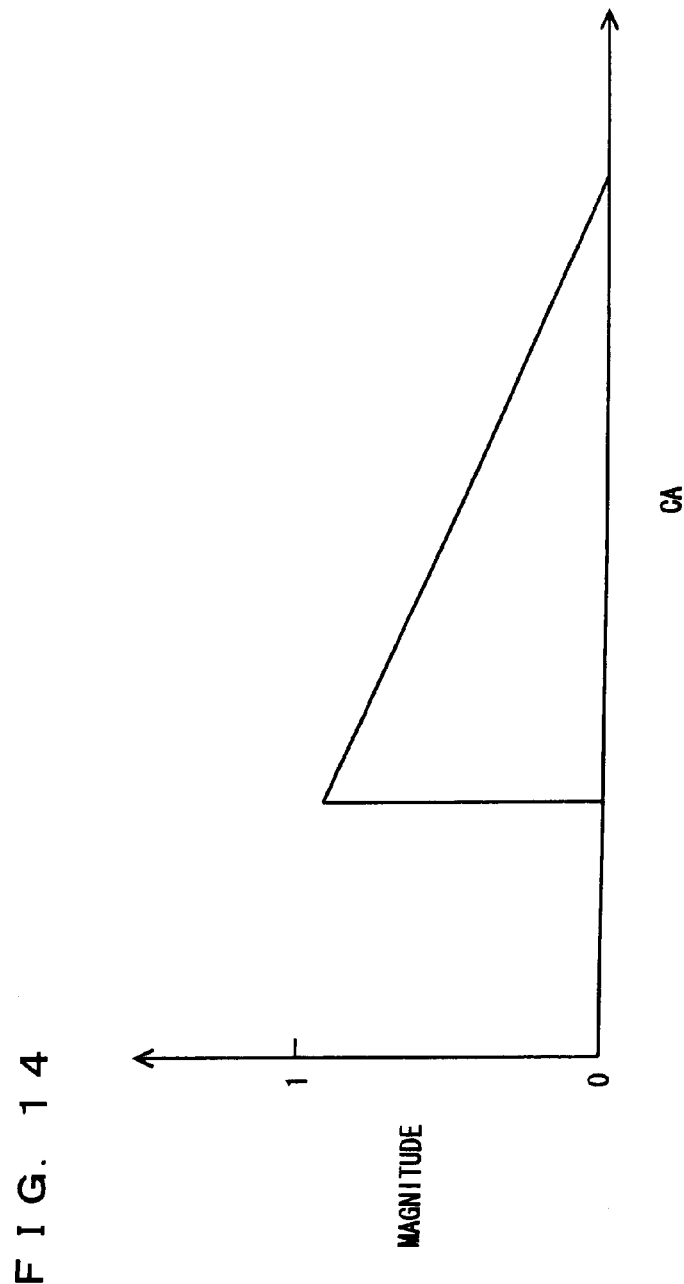
FIG. 14 is a diagram representing a knock waveform model stored in the memory of the engine ECU in the present ignition control system in a fifth embodiment.

As shown in FIG. 14, the engine ECU 200 memory 202 has stored therein a knock waveform model corresponding to a portion of vibration, represented in magnitude, caused by knocking that follows a peak. Note that a knock waveform model that corresponds to vibration attributed to knocking following the rise of the vibration, may be stored.

In the model, vibration's magnitude is represented by a dimensionless number of 0 to 1 and does not uniquely correspond to a crank angle. More specifically, for the present embodiment's knock waveform model, after vibration's peak value in magnitude the vibration is reduced in magnitude as the crank angle increases, however the crank angle for which the vibration has the peak value in magnitude is not determined. Furthermore, the model is a wave of a composition of vibration of frequency bands. In FIG. 14, CA represents a crank angle.

Figure 15:
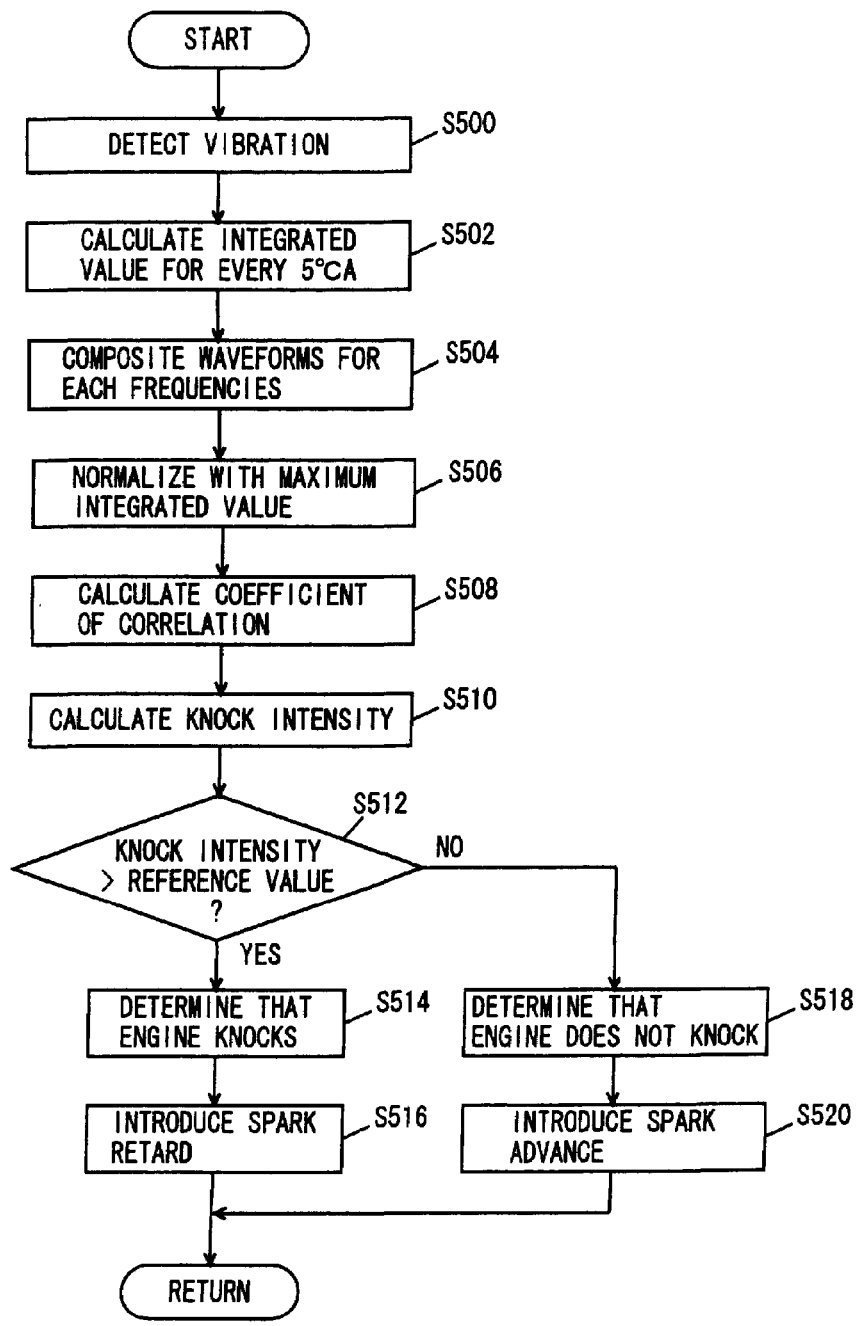
FIG. 15 is a flow chart for illustrating a structure for control of a program executed by the engine ECU in the present ignition control system in the fifth embodiment.

With reference to FIG. 15, in present embodiment's ignition control system engine ECU 200 executes a program controlled in a structure as will be described hereinafter.

At S500 engine ECU 200 detects the engine 100 vibration in magnitude from a signal transmitted from knock sensor 300. The vibration's magnitude is represented by a value of voltage output from knock sensor 300. Note that the vibration's magnitude may be represented by a value corresponding to the value of the voltage output from knock sensor 300. The vibration's magnitude is detected in a combustion process for an angle from a top dead center to (a crank angle of) 90°.

At S502 engine ECU 200 calculates for a crank angle of every five degrees an integration (hereinafter also be referred to as an "integrated value") of values of voltage output from knock sensor 300 (i.e., representing magnitude of vibration). The integrated value is calculated for vibration of each frequency band. Thus a waveform of vibration of each frequency band is detected. Note that the integrated value may be calculated for a crank angle other than every five degrees.

At 504 engine ECU 200 composites waveforms of vibration of frequency bands. Thus engine 100 vibration waveform is detected. At S506 engine ECU 200 uses the largest integrated value of waveforms of vibration composited to normalize the engine's vibration waveform. Herein, normalizing a waveform means dividing each integrated value by the largest integrated value to represent the vibration's magnitude by a dimensionless number of 0 to 1.

At S508 engine ECU 200 calculates a coefficient of correlation K, a value associated with a deviation of a normalized vibration waveform and a knock waveform mode. A timing of the normalized vibration waveform achieving vibration maximized in magnitude and that of the model achieving vibration maximized in magnitude are matches, while the deviation in absolute value (or an amount of offset) of the normalized vibration waveform and the model is calculated for each crank angle (of five degrees) to calculate the coefficient of correlation K.

If the normalized vibration waveform and the model provides a deviation $\Delta S$ (I) in absolute value for each crank angle and the model's vibration as represented in magnitude integrated by the crank angle (i.e., the model's area) is represented by S, then the coefficient of correlation K is calculated by an equation K=(S−$\Sigma \Delta S$ (I))/S, wherein $\Sigma \Delta S$ (I) represents a sum of $\Delta S$ (I). Note that the coefficient of correlation K may be calculated by a different method.

At S510 engine ECU 200 calculates a knock intensity N. If calculated integrated values have a largest value P and engine 100 does not knock and vibrates with a magnitude represented in value by a background level (BGL), then knock intensity N is calculated by an equation N=P×K/BGL. The BGL is stored in memory 202. Note that knock intensity N may be calculated by a different method.

At S512 engine ECU 200 determines whether knock intensity N is larger than a predetermined reference value. If so (YES at S512) the control proceeds with S514, otherwise (NO at S512) the control proceeds with S518.

At S514 engine ECU 200 determines that engine 100 knocks. At S516 engine ECU 200 introduces a spark retard. At S518 engine ECU 200 determines that engine 100 does not knock. At S502 engine ECU 200 introduces a spark advance.

In accordance with the above described configuration and flow chart for the present embodiment's ignition control system engine ECU 200 operates as will be described hereinafter.

When a driver turns on ignition switch 312 and engine 100 starts, the engine 100 vibration is detected in magnitude from a signal transmitted from knock sensor 300 (S500).

Figure 16:
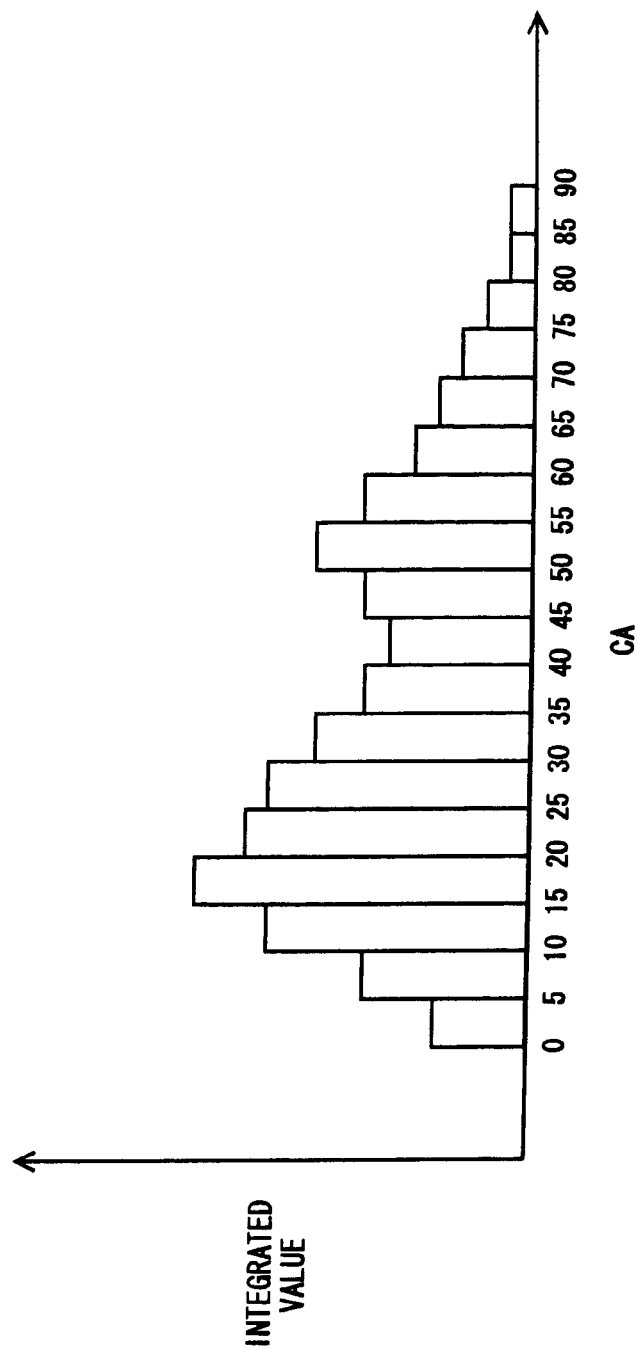
FIG. 16 shows an integrated value calculated for every five degrees.

In a combustion process for a range from the top dead center to 90° an integrated value for every five degrees is calculated for each frequency (S502) and integrated values calculated for the frequencies are composited together (S504). Thus, as shown in FIG. 16, the engine 100 vibration waveform is detected. Note that while FIG. 16 represents a vibration waveform in a rectangle, each integrated value may be connected by a line to represent the vibration waveform. Furthermore, each integrated value alone may be represented in a dot to represent the vibration waveform.

Using an integrated value for every five degrees to detect a vibration waveform allows minimized detection of a waveform of vibration having a complicated form attributed to vibration having a magnitude varying minutely. This can help to compare a detected vibration waveform with a knock waveform model.

Of thus detected vibration waveforms' integrated values, the maximum integrated value is used to normalize the engine's vibration waveform (S506). Herein the integrated value for 15° to 20° is used to normalize the engine's vibration waveform for the sake of illustration.

Figure 17:
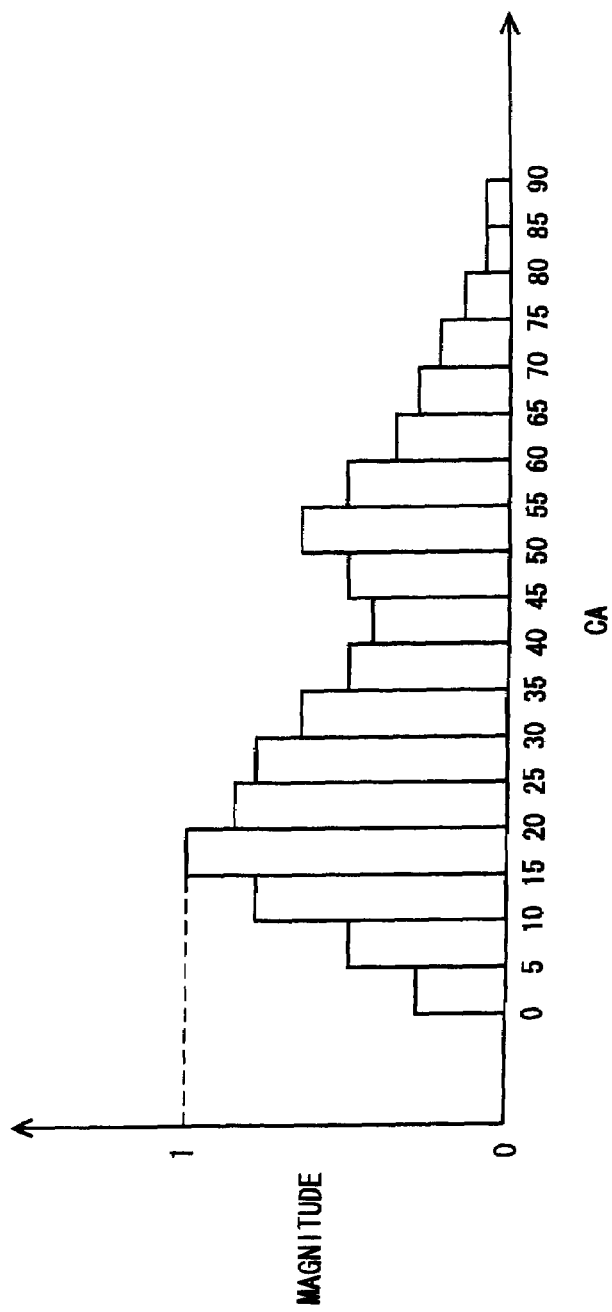
FIG. 17 represents a normalized vibration waveform.

In the normalization, an integrated value for each crank angle is divided by that for 15 to 20° and, as shown in FIG. 17, the magnitude of vibration in the vibration waveform is represented by a dimensionless number of 0 to 1. By this normalization a detected vibration waveform and a knock waveform model can be compared regardless of magnitude of vibration. This can eliminate the necessity of storing a large number of knock waveform models corresponding to magnitude of vibration and thus help to create a knock waveform model.

Figure 18:
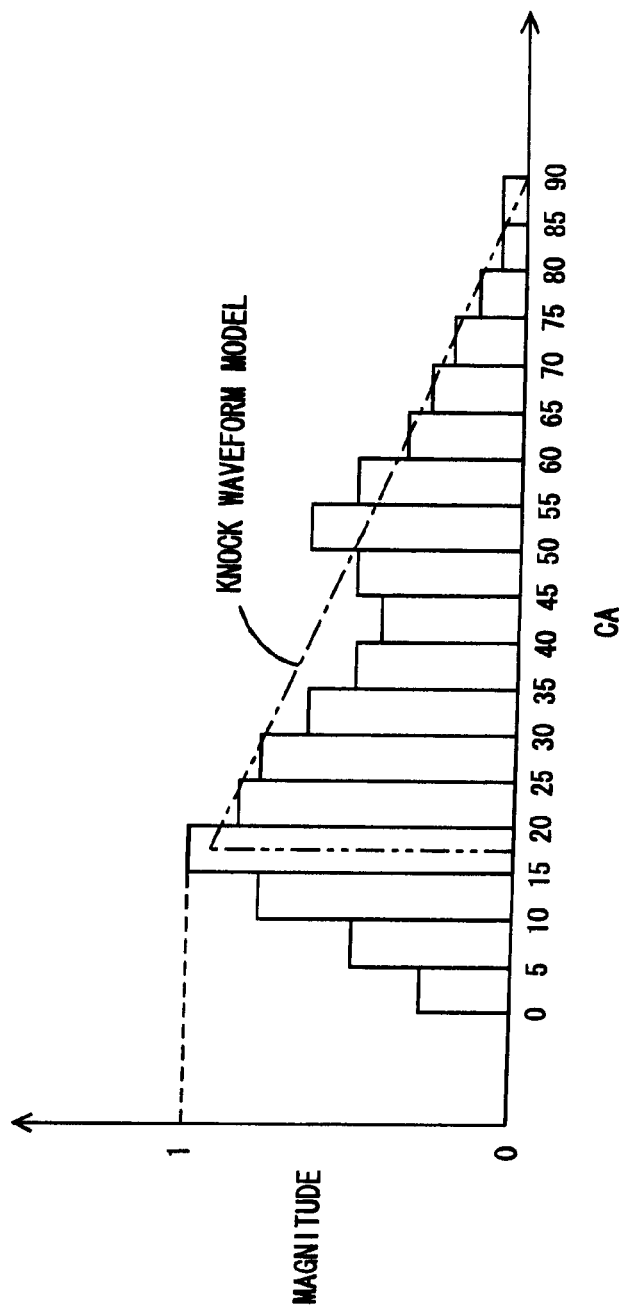
FIG. 18 represents a knock waveform model and an engine's vibration waveform.

As shown in FIG. 18, a timing of a normalized vibration waveform providing vibration maximized in magnitude and that of a knock waveform model providing vibration maximized in magnitude are matched, while a deviation in absolute value $\Delta S$ (I) of the normalized vibration waveform and the knock waveform model is calculated for each crank angle. Sum $\Sigma \Delta S$ (I) of such $\Delta S$ (I)s and value S representing a magnitude of vibration in knock waveform model that is integrated by crank angle are used to calculate the coefficient of correlation K=(S−$\Sigma \Delta S$ (I)) (S508). This allows a degree of matching of a detected vibration waveform and a knock waveform model to be numerically represented and thus objectively determined.

Furthermore the product of the calculated coefficient of correlation K and the maximum integrated value P is divided by the BGL to calculate knock intensity N (S512). Thus, in addition to the degree of matching between the detected vibration waveform and the knock waveform model, vibration's magnitude can also be depended on to analyze in more detail whether the engine 100 vibration is attributed to knocking.

If knock intensity N is larger than a predetermined reference value (YES at S512) a decision is made that engine knocks (S514) and a spark retard is introduced (S516) to prevent the engine from knocking.

If knock intensity N is not larger than the predetermined reference value (NO at S512), a decision is made that the engine does not knock (S108) and a spark advance is introduced (S110).

Thus in the present embodiment's ignition control system the engine ECU detects the engine's vibration waveform based on a signal transmitted from a knock sensor and compares the vibration waveform with a knock vibration model to calculate the coefficient of correlation K. Furthermore, the product of the coefficient of correlation K and the vibration waveform's maximum integrated value P is divided by the BGL to calculate knock intensity N. If knock intensity N is larger than a reference value, a decision is made that the engine knocks. If knock intensity N is not larger than the reference value, a decision is made that the engine does not knock. Thus, in addition to a degree of matching between a detected vibration waveform and a knock waveform model, vibration's magnitude can also be depended on to analyze in more detail whether the engine's vibration is attributed to knocking. Thus whether the engine knocks or not can be determined with high precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knock determination device for an internal combustion engine, comprising: a crank angle detector detecting said internal combustion engine's crank angle; a waveform detector detecting a waveform of vibration of said internal combustion engine for a predetermined crank angle range; a storage previously storing a waveform of vibration of said internal combustion engine for said predetermined crank angle range; and a determiner determining whether said internal combustion engine knocks, as based on a result of comparing the detected waveform and the stored waveform, wherein when said internal combustion engine has a spark retard as compared with a predetermined crank angle, said determiner determines whether said internal combustion engine knocks, as based on a result of comparing a waveform of vibration of a frequency higher than a predetermined frequency with the stored waveform.

2. An ignition control system comprising: said knock determination device as recited in claim 1; and a spark retard device providing said internal combustion engine with a spark retard when said knock determination device determines that said internal combustion engine knocks.

3. A knock determination device for an internal combustion engine, comprising: a crank angle detector detecting said internal combustion engine's crank angle; a waveform detector detecting a waveform of vibration of said internal combustion engine for a predetermined crank angle range; a storage previously storing a waveform of vibration of said internal combustion engine for said predetermined crank angle range; a corrector correcting the waveform of the vibration of said internal combustion engine stored in said storage, as based on a waveform of vibration of said internal combustion engine detected when said internal combustion engine is in a predetermined driving condition; and a determiner determining whether said internal combustion engine knocks, as based on a result of comparing the detected waveform and the corrected waveform.

4. An ignition control system comprising: said knock determination device as recited in claim 3; and a spark retard device providing said internal combustion engine with a spark retard when said knock determination device determines that said internal combustion engine knocks.

5. The knock determination device according to claim 3, wherein said determiner determines that said internal combustion engine knocks when the detected waveform and the corrected waveform match within a predetermined range.

6. An ignition control system comprising: said knock determination device as recited in claim 5; and a spark retard device providing said internal combustion engine with a spark retard when said knock determination device determines that said internal combustion engine knocks.

7. The knock determination device according to claim 3, wherein said corrector corrects the waveform of the vibration of said internal combustion engine stored in said storage, as based on a waveform of vibration of said internal combustion engine detected when fuel supplied to said internal combustion engine is interrupted.

8. An ignition control system comprising: said knock determination device as recited in claim 7; and a spark retard device providing said internal combustion engine with a spark retard when said knock determination device determines that said internal combustion engine knocks.

9. The knock determination device according to claim 3, wherein: said corrector corrects the waveform of the vibration of said internal combustion engine stored in said storage, as based on a waveform of vibration of said internal combustion engine detected when said internal combustion engine's output transitions; and when said internal combustion engine's output transitions, said determiner determines whether said internal combustion engine knocks, as based on a result of comparing the detected waveform and the corrected waveform.

10. An ignition control system comprising: said knock determination device as recited in claim 9; and a spark retard device providing said internal combustion engine with a spark retard when said knock determination device determines that said internal combustion engine knocks.

11. A knock determination device for an internal combustion engine, comprising: a crank angle detector detecting said internal combustion engine's crank angle; a vibration detector detecting a value associated in magnitude with vibration of said internal combustion engine; a waveform detector detecting, as based on the value associated in magnitude with vibration of said internal combustion engine, a waveform of vibration of said internal combustion engine for a predetermined crank angle range; a storage previously storing a waveform of vibration of said internal combustion engine; and a determiner determining whether said internal combustion engine knocks, as based on a result of comparing the detected waveform with the stored waveform, wherein said waveform detector detects the waveform of vibration of said internal combustion engine, as based on the value associated in magnitude with vibration of said internal combustion engine divided by a maximum one of values associated in magnitude with vibration detected.

12. The knock determination device according to claim 11, wherein said vibration detector detects at a predetermined interval the value associated in magnitude with vibration of said internal combustion engine.

13. The knock determination device according to claim 11, wherein said determiner determines whether said internal combustion engine knocks, as based on a result of comparing the detected waveform with the stored waveform while a timing of the detected waveform attaining vibration maximized in magnitude and that of the stored waveform attaining vibration maximized in magnitude are matched.

14. The knock determination device according to claim 11, further comprising a deviation calculator calculating a deviation of the detected waveform and the stored waveform, said determiner determining from said deviation whether said internal combustion engine knocks.

15. The knock determination device according to claim 14, wherein said determiner determines whether said internal combustion engine knocks from said deviation and in addition thereto said maximum value associated in magnitude with vibration of said internal combustion engine.

* * * * *